United States Patent [19]
Hansen

[11] Patent Number: 5,944,406
[45] Date of Patent: Aug. 31, 1999

[54] ROTATABLE COMPARTMENT LIGHT FOR VEHICLES

[76] Inventor: Randall C. Hansen, 6 Old Mill Ct., Columbia, S.C. 29206

[21] Appl. No.: 08/704,933

[22] Filed: Aug. 30, 1996

[51] Int. Cl.$^6$ .................................................... B60Q 1/00
[52] U.S. Cl. .......................... 362/80; 362/83.3; 362/277; 362/322
[58] Field of Search .................. 362/80, 83.3, 310, 362/277, 322, 321, 319

[56] References Cited

U.S. PATENT DOCUMENTS

| | | |
|---|---|---|
| 1,064,515 | 6/1913 | Miller ....................................... 362/83.3 |
| 2,944,145 | 7/1960 | Legge ....................................... 362/322 |
| 3,020,392 | 2/1962 | Leslie ....................................... 362/80 |
| 3,721,374 | 3/1973 | Eby . |
| 4,353,110 | 10/1982 | Ellis . |
| 4,475,147 | 10/1984 | Kristofek ................................. 362/319 |
| 4,620,268 | 10/1986 | Ferenc . |
| 4,981,363 | 1/1991 | Lipman . |
| 5,091,828 | 2/1992 | Jincks et al. . |

*Primary Examiner*—James C. Yeung
*Attorney, Agent, or Firm*—Dority & Manning, P.A.

[57] ABSTRACT

A rotatable compartment light for vehicles is provided. A lens covering a light source is rotatably mounted to a panel of the vehicle. The lens defines at least two sections having different light passing characteristics. A first section is configured to pass light from the light source to form a spotlight. The lens is configured so that the spotlight may be directed to a desired area by rotating the lens. An adjusting mechanism is in operative communication with the lens and is configured to rotate the lens.

28 Claims, 3 Drawing Sheets

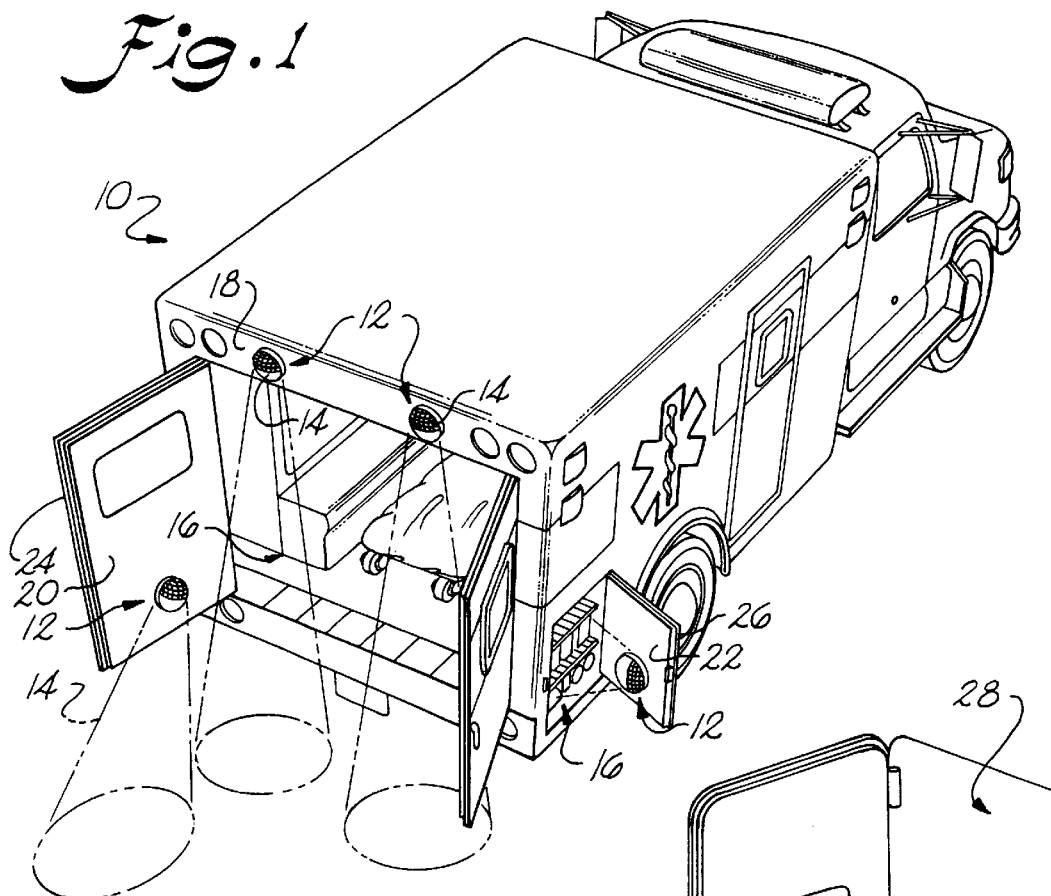
Fig.1
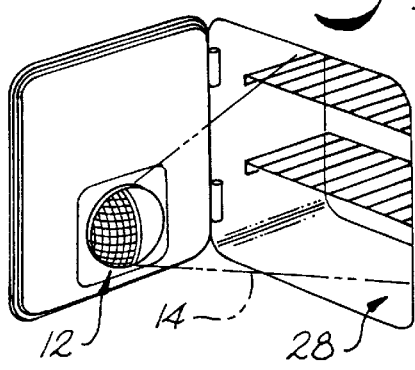
Fig.2A
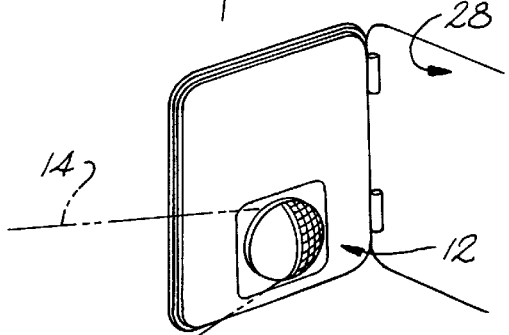
Fig.2B
Fig.2C

ROTATABLE COMPARTMENT LIGHT FOR VEHICLES

BACKGROUND OF THE INVENTION

The present invention relates to lighting systems for vehicles. More particularly, the invention relates to a rotatable compartment light for vehicles.

Service vehicles, and particularly emergency vehicles, often have interior compartments ranging from large bays to relatively small storage compartments in or around which the vehicle operators must work. For example, it may be necessary to retrieve gear from or return gear to such compartments. Proper lighting in and about these areas is essential.

Lighting systems for service vehicles are known. These may include, for example, interior dome lights. Generally, however, such lights radiate light either in one fixed direction only or in all directions from a fixed position. Thus, such lights often fail to illuminate desired areas in or about the compartment and/or produce undesirable glare to the vehicle operator.

Accordingly, it can be seen that a need exists for a vehicle compartment light from which light can be selectively directed to a desired area in or about a compartment without hindering the work of a vehicle operator.

SUMMARY OF THE INVENTION

The present invention recognizes and addresses the foregoing disadvantages, and others, of prior art construction and methods.

Accordingly, it is an object of the present invention to provide improved compartment lighting for vehicles.

More particularly, it is an object of the present invention to provide a rotatable vehicle compartment light which creates a spotlight which can be directed to a desired area in or about a vehicle compartment.

It is also an object of the present invention to provide an improved vehicle compartment light having a marker light in addition to a spotlight.

It is a still further object of the present invention to provide a vehicle having a rotatable compartment light creating a spotlight which may be directed to a desired area in or about a compartment of the vehicle.

Additional objects and advantages of the invention will be set forth in part in the following description, or may be obvious from the description, or may be learned through practice of the invention.

Some of these objects are achieved by a rotatable compartment light having a lens covering a light source. The lens is rotatably mounted to a panel of the vehicle and defines at least two sections having different light passing characteristics. A first section is configured to pass light from the light source to form a spotlight. The lens is configured so that the spotlight may be directed to a desired area by rotating the lens. An adjusting mechanism is in operative communication with the lens and is configured to rotate the lens.

In a preferred embodiment, the first section defines half the lens. The other half is defined by a second section that is colored to form a marker light. A manual tab is placed on the marker light to enable the vehicle operator to rotate the lens. Thus, the marker light identifies where the adjustment mechanism is located so that the vehicle operator can quickly turn the spotlight to a desired area.

The marker lights may be disposed at various positions proximate vehicle compartments. For example, lights may be placed above rear bay doors to light work areas outside the rear bay. They may also be positioned, for example, in compartment doors so that they may be rotated to light the interior of the compartment or the work area proximate the compartment.

Such lights are particularly effective in emergency vehicles such as ambulances. They may be used to effectively light an ambulance bay or compartment area and may be quickly rotated to light one or more work areas adjacent the ambulance.

In yet another preferred embodiment, a vehicle constructed in accordance with the present invention includes at least one rotatable compartment light configured to direct a spotlight to a desired area in or about a vehicle compartment. The compartment lights may be disposed on walls or doors having inner and outer panels. Lights are disposed on inner panels of doors so that when a door is opened a spotlight may be directed into its corresponding compartment or to a work area outside the compartment. A second lens may preferably be disposed on the outer wall to create a warning light on the outside of the door.

The accompanying drawings, which are incorporated in and constitute a part of the specification, illustrate one embodiment of the invention and, together with the description, serve to explain the principles of the invention.
dr

BRIEF DESCRIPTION OF THE DRAWINGS

A full and enabling disclosure of the present invention, including the best mode thereof and directed to one of ordinary skill in the art, is set forth in the specification, which makes reference to the appended drawings, in which:

FIG. 1 is a perspective view of a vehicle constructed in accordance with the present invention;

FIGS. 2A through 2C are perspective views of rotatable compartment lights constructed in accordance with the present invention mounted on compartment doors and rotated to direct spotlights to desired positions;

Figure 3:
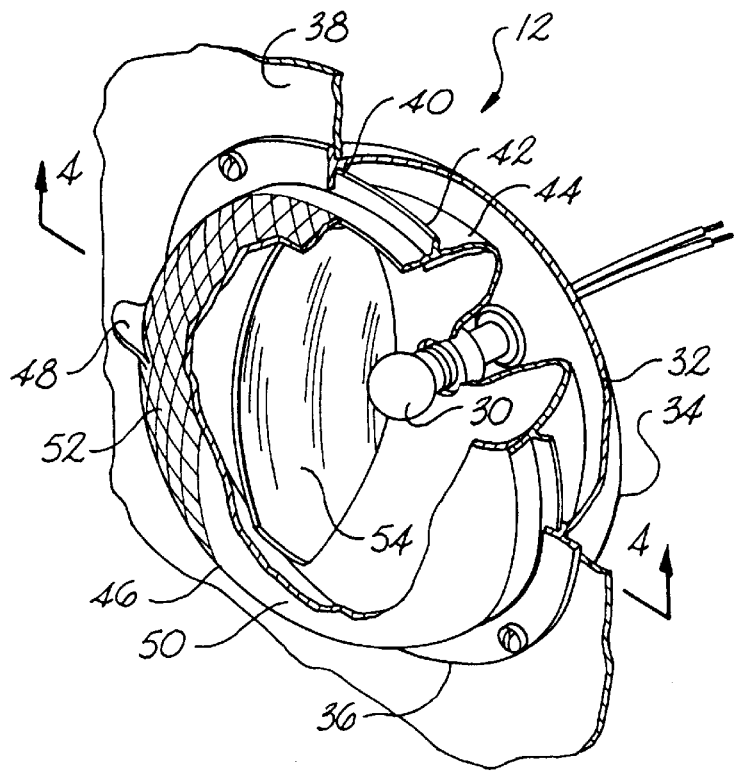
FIG. 3 is a cutaway perspective view of a rotatable compartment light constructed in accordance with the present invention.

Repeat use of reference characters in the present specification and drawings is intended to represent same or analogous features or elements of the invention.

DETAILED DESCRIPTION OF THE PREFERRED EMBODIMENTS

Reference will now be made in detail to the presently preferred embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

The present invention is concerned with an improved vehicle having rotatable compartment lights. Accordingly, FIG. 1 depicts a presently preferred embodiment of a vehicle 10. Rotatable compartment lights 12 emit spotlights 14 to areas in or around compartment 16.

Two compartment lights 12 are mounted on panel 18 of the rear wall of vehicle 10. Other compartment lights are mounted on panels 20 and 22 of a rear door 24 and a side door 26, respectively.

Compartment lights 12 are rotatable so that the spotlight 14 may be directed to desired areas in or about a compartment such as compartment 28 illustrated in FIGS. 2A, 2B and 2C. FIG. 2A, for example, depicts compartment light 12 rotated such that spotlight 14 illuminates the interior of the compartment. FIG. 2B and FIG. 2C illustrate rotatable compartment light 12 illuminating work areas proximate the compartment.

FIG. 3 illustrates an exemplary construction of compartment light 12. A light bulb 30 is mounted to a bracket 32 having a bowl shaped portion 34 and a circular track assembly 36 mounted to panel 38. Circular track assembly 36 includes an annular groove 40 receiving an annular flange 42 of a housing 44. Flange 42 is slidably received in groove 40 so that groove 40 guides and retains housing 44 as housing 44 rotates.

Lens 46 is secured to housing 44 such that lens 46 rotates with housing 44. A tab 48 is provided on lens 46 so that a vehicle operator can rotate lens 46 and housing 44 about track assembly 36 as indicated at double arrow A in FIG. 4.

Lens 46 defines a first section 50 configured to pass light from light bulb 30 to form a spotlight. First section 50 may be constructed, for example, from clear glass or plastic. Lens 46 also defines a second section 52 configured to emit a warning light. Second section 52 may be constructed, for example, from glass or plastic that is colored, checked or otherwise obscured to emit colored, dimmed or otherwise obscured light as a marker light. Tab 48 is preferably located on the marker light so that the marker light identifies the position of the mechanism used to rotate the lens and housing to direct the spotlight to a desired location.

Figure 4:
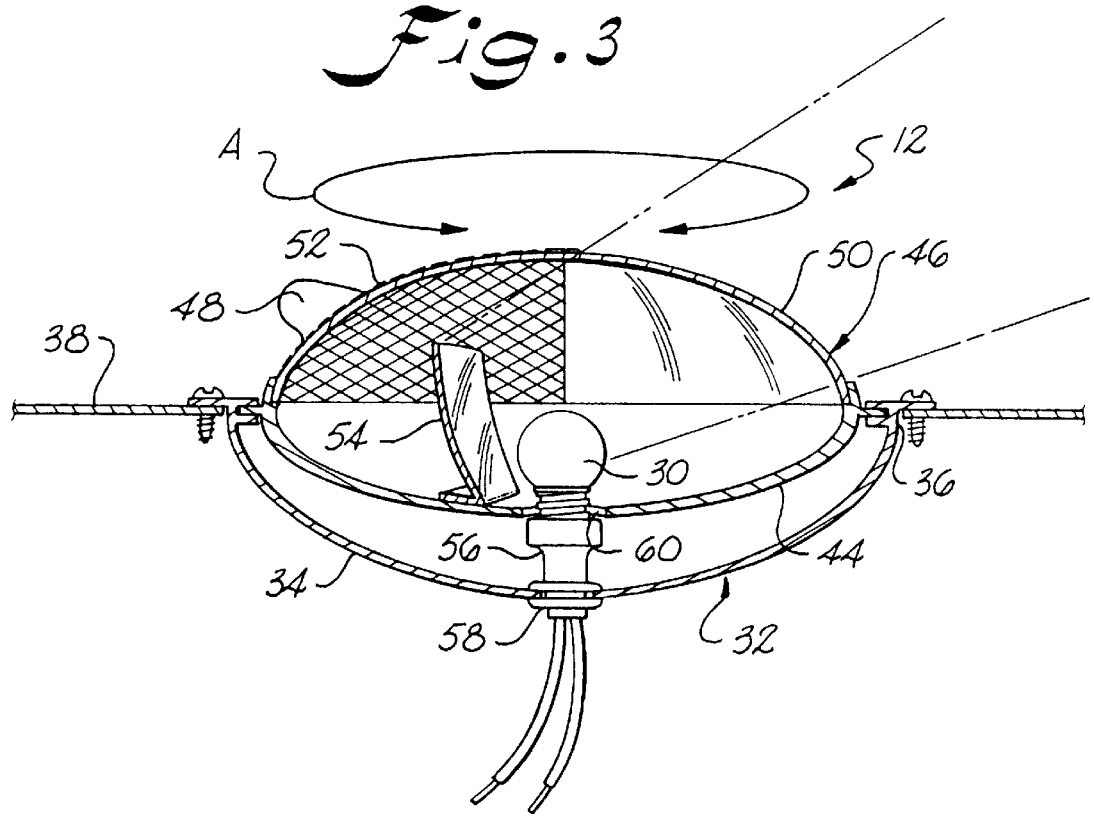
FIG. 4 is a cross-sectional view of the rotatable compartment light illustrated in FIG. 3.

As illustrated in FIG. 4, housing 44 includes a reflector 54 positioned opposite light bulb 30 from first section 50 of lens 46. Reflector 54 reflects light out through first section 50, increasing the spotlight effect. It also partially blocks light from passing through second section 52, thereby reducing the intensity of the marker light.

The construction illustrated in FIGS. 3 and 4 provides a rotatable compartment light that creates a spotlight and a marker light. An operator is thus able to direct light to a desired area in or about a compartment of the vehicle while avoiding glare often associated with dome lights or other floodlights. This exemplary construction, however, illustrates only one preferred embodiment, and other suitable constructions are understood to be within the scope and spirit of the invention. For example, various lens section configurations and various constructions of the lens, housing and bracket are possible. For example, the housing may be configured to pivot within the bracket to provide a greater range of deployment for the spotlight.

Furthermore, various means of securing a light source such as light bulb 30 are possible. For example, FIG. 4 illustrates light bulb 30 attached to a base 56 secured to bracket 32 at fixture 58. Light bulb 30 extends through housing 44 at passage 60, which has a diameter at least large enough to permit housing 44 to rotate about light bulb 30.

Figure 5:
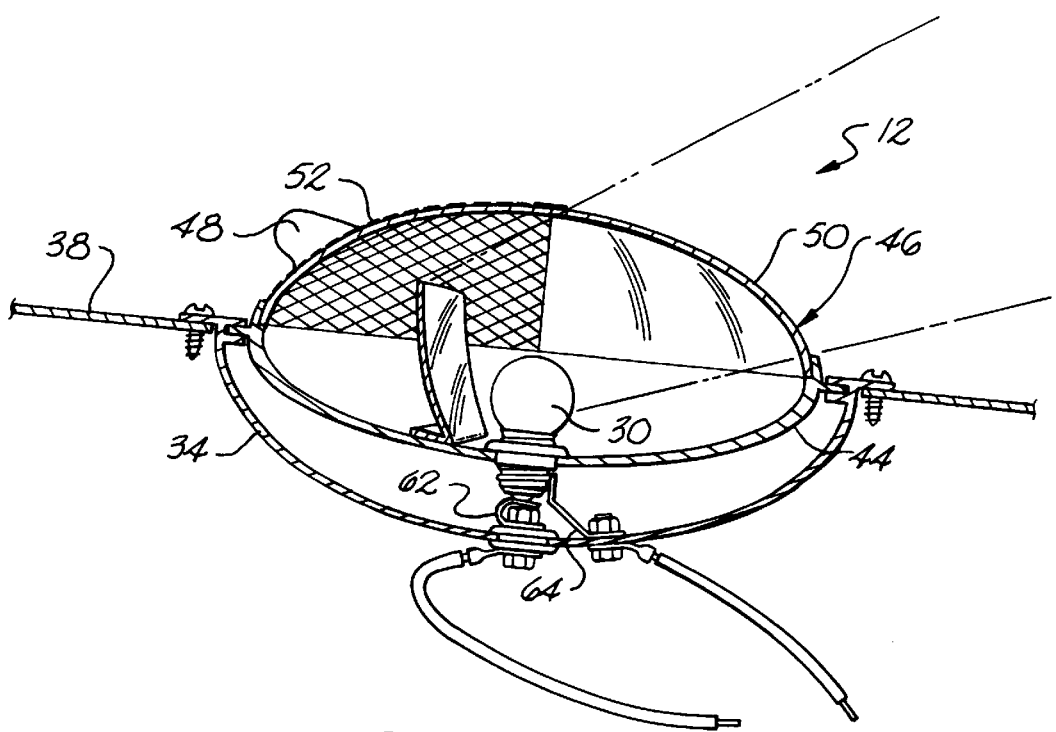
FIG. 5 is a cross-sectional view of a rotatable compartment light constructed in accordance with the present invention.

Alternatively, referring to FIG. 5, light bulb 30 may be directly mounted to housing 44 such that light bulb 30 rotates with the housing. Wear strips 62 and 64 are provided in contact with light bulb 30 to energize the light bulb as it rotates.

Figure 6:
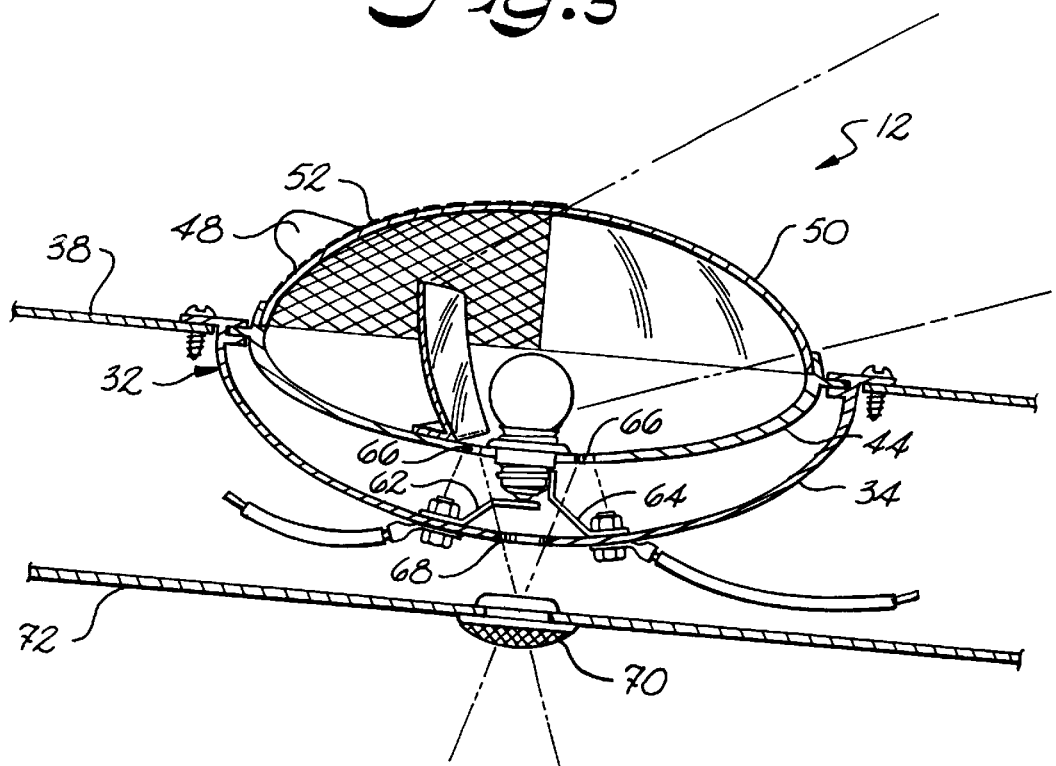
FIG. 6 is a cross-sectional view of a rotatable compartment light constructed in accordance with the present invention.

FIG. 6 illustrates a construction similar to that illustrated in FIG. 5, with the addition of apertures 66 and 68 in housing 44 and bracket 32, respectively, to permit the passage of light to a second lens 70 disposed on a second panel 72. Lens 70 may be obscured by various manners to provide a warning light in second panel 72. The construction illustrated in FIG. 6 may be used, for example, in vehicle walls or doors where it is desirable to provide a marker or warning light on the side of the wall or door opposite light 12.

While preferred embodiments of the invention have been described above, it is to be understood that any and all equivalent realizations of the present invention are included within the scope and spirit thereof. Thus, the embodiments depicted are presented by way of example only and are not intended as limitations upon the present invention. While particular embodiments of the invention have been described and shown, it will be understood by those of ordinary skill in this art that the present invention is not limited thereto since many modifications can be made. Therefore, it is contemplated that any and all such embodiments are included in the present invention as may fall within the literal or equivalent scope of the appended claims.

What is claimed:

1. A rotatable compartment light for vehicles, said compartment light comprising:

a lens covering a light source and rotatably mounted to a panel of the vehicle via a bracket mounted to the panel about said light source, said bracket having a circular track assembly, said lens being mounted to said bracket in cooperation with said circular track assembly so that said lens is rotatable about an axis normal to the plane of said circular track assembly, said bracket including a bowl shaped portion extending from said track assembly, said bracket being configured to be secured to the panel at said track assembly so that said bowl shaped portion is recessed within the vehicle, said lens defining at least two sections having different light passing characteristics, a first said section being configured to pass light from said light source to form a spotlight, said lens being configured so that said spotlight may be directed to a desired area by rotating said lens.

2. The compartment light as in claim 1, wherein said bracket is secured in a stationary position with respect to the panel and wherein said lens rotates with respect to said bracket.

3. The compartment light as in claim 1, wherein said bracket is secured in a position in the plane of the panel.

4. The compartment light as in claim 1, wherein said bracket is configured so that said light source may be mounted thereto.

5. The compartment light as in claim 1, further including an adjusting mechanism in operative communication with said lens and configured to rotate said lens, said adjusting mechanism including a tab mounted to said lens.

6. The compartment light as in claim 1, wherein a second said section of said lens is configured to form a marking light.

7. The compartment light as in claim 6, wherein said second section is colored.

8. The compartment light as in claim 1, wherein said first section and a second said section are defined by respective halves of said lens.

9. The compartment light as in claim 1, wherein said lens is dome shaped.

10. A rotatable compartment light for vehicles, said compartment light comprising:

a lens covering a light source and rotatably mounted to a panel of the vehicle via a bracket mounted to the panel about said light source, said bracket having a circular track assembly, said lens being mounted to said bracket in cooperation with said circular track assembly so that said lens is rotatable about an axis normal to the plane of said circular track assembly, said lens defining at least two sections having different light passing characteristics, a first said section being configured to pass light from said light source to form a spotlight, said lens being configured so that said spotlight may be directed to a desired area by rotating said lens; and a housing received by said bracket and extending therefrom to said light source, said lens being mounted to said bracket via said housing.

11. The compartment light as in claim 10, wherein said bracket is secured in a stationary position with respect to the panel and wherein said track assembly defines a groove slidably receiving, and thereby guiding rotation of, said housing and said lens.

12. The compartment light as in claim 10, further including an adjusting mechanism in operative communication with said lens and configured to rotate said lens.

13. A rotatable compartment light for vehicles, said compartment light comprising:

a lens covering a light source and rotatably mounted to a panel of the vehicle via a bracket mounted to the panel about said light source, said bracket having a circular track assembly, said lens being mounted to said bracket in cooperation with said circular track assembly so that said lens is rotatable about an axis normal to the plane of said circular track assembly, said lens defining at least two sections having different light passing characteristics, a first said section being configured to pass light from said light source to form a spotlight, said lens being configured so that said spotlight may be directed to a desired area by rotating said lens; and a housing received by said bracket and extending therefrom to said light source, said bracket being configured so that said light source may be mounted thereto, said housing defining a passage therethrough for admission of said light source.

14. The compartment light as in claim 13, wherein said housing includes a reflector disposed across a portion of said housing on the side of said light source opposite said first section so that said reflector reflects light from said light source to said first section.

15. The compartment light as in claim 13, further including an adjusting mechanism in operative communication with said lens and configured to rotate said lens.

16. A rotatable compartment light for vehicles, said compartment light comprising:

a lens covering a light source and rotatably mounted to a panel of the vehicle via a bracket mounted to the panel about said light source, said bracket having a circular track assembly, said lens being mounted to said bracket in cooperation with said circular track assembly so that said lens is rotatable about an axis normal to the plane of said circular track assembly, said lens defining at least two sections having different light passing characteristics, a first said section being configured to pass light from said light source to form a spotlight, said lens being configured so that said spotlight may be directed to a desired area by rotating said lens; and a housing received by said bracket and extending therefrom to said light source, said housing being configured so that said light source may be mounted thereto, said light source being a light bulb, said bracket including two electrical wear strips configured to contact and energize said light bulb when said light bulb is secured by said housing.

17. The compartment light as in claim 16, further including an adjusting mechanism in operative communication with said lens and configured to rotate said lens.

18. A vehicle comprising:

a light source disposed proximate a compartment of the vehicle in or about which light is to be directed;

a bracket mounted to a panel of the vehicle proximate said light source, said bracket including a circular track assembly;

a lens covering said light source and rotatably mounted to said bracket in cooperation with said circular track assembly so that said lens is rotatable about an axis normal to the plane of said circular track assembly, said lens defining at least two sections having different light passing characteristics, a first said section being configured to pass light from said light source to form a spotlight, said lens being configured so that said spotlight may be directed to a desired area by rotating said lens; and a housing received by said bracket and extending therefrom to said light source, said lens being mounted to said bracket via said housing, said track assembly defining an annular groove, said housing being mounted to said bracket by an annular flange slidably received by said annular groove so that said annular groove guides and retains said housing as said housing and said lens are rotated.

19. The vehicle as in claim 18, wherein said panel is disposed on a door of the vehicle.

20. The vehicle as in claim 18, wherein said panel is disposed on a wall of the vehicle.

21. The vehicle as in claim 18, wherein said lens is dome shaped, wherein said first section and said second section are defined by respective halves of said lens, and wherein said housing includes a reflector disposed across a portion of said housing on the side of said light source opposite said first section so that said reflector reflects light from said light source to said first section.

22. The vehicle as in claim 18, wherein a second said section is configured to form a marker light.

23. A vehicle as in claim 18, further including an adjusting mechanism in operative communication with said lens and configured to rotate said lens.

24. A vehicle comprising:

a light source disposed proximate a compartment of the vehicle in or about which light is to be directed;

a bracket mounted to a panel of the vehicle proximate said light source;

a lens covering said light source and rotatable mounted to said bracket, said lens defining at least two sections having different light passing characteristics, a first said section being configured to pass light from said light source to form a spotlight said lens being configured so that said spotlight may be directed to a desired area by rotating said lens; and a second panel proximate said first panel and said light source on the side of said light source opposite said lens, said second panel including a second lens having different light passing characteristics from said first section to form a marker light.

25. A vehicle as in claim 24, further including an adjusting mechanism in operative communication with said lens and configured to rotate said lens.

26. A rotatable compartment light for vehicles, said compartment light comprising:

a bracket mounted to a panel of the vehicle about a light source, said bracket having a circular track assembly defining an annular groove;

a housing including an annular flange received by said annular groove so that said housing is guided and retained by said annular groove as said housing is rotated, said housing including a bowl shaped portion extending from said annular flange so that said bracket and said housing are at least partially recessed within said vehicle;

a lens covering said light source and mounted to said housing so that said lens and said housing rotate together, said lens defining a first section to pass light from said light source to form a spotlight and a second section to partially pass light from said light source to form a marker light, wherein said first section is defined by said lens so that light passing through said first section may be directed to or about a compartment of the vehicle by rotating said lens; and an adjusting mechanism in operative communication with said lens and configured to rotate said lens and said housing, wherein said housing includes a reflector disposed across a portion of said housing on the side of said light source opposite said first section so that said reflector reflects light from said light source to said first section.

27. The compartment light as in claim 26, wherein said bracket is configured so that said light source may be mounted thereto and wherein said housing defines a passage therethrough for admission of said light source.

28. The compartment light as in claim 26, wherein said housing is configured so that said light source may be mounted thereto.

* * * * *